(12) United States Patent
Hwang

(10) Patent No.: US 7,313,632 B2
(45) Date of Patent: Dec. 25, 2007

(54) APPARATUS FOR CONVERTING INTERNET PROTOCAL ADDRESS, AND COMMUNICATION METHOD USING THE SAME

(75) Inventor: Pil-Yong Hwang, Gyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 796 days.

(21) Appl. No.: 10/338,041

(22) Filed: Jan. 8, 2003

(65) Prior Publication Data
US 2003/0149790 A1 Aug. 7, 2003

(30) Foreign Application Priority Data
Jan. 8, 2002 (KR) .................................. 2002-1061

(51) Int. Cl.
G06F 15/16 (2006.01)
H04L 12/58 (2006.01)

(52) U.S. Cl. ...................... 709/245; 370/395; 370/401; 370/466

(58) Field of Classification Search ...................... None
See application file for complete search history.

(56) References Cited

U.S. PATENT DOCUMENTS 6,580,717 B1 * 6/2003 Higuchi et al. ............. 370/401
6,862,274 B1 * 3/2005 Tsao et al. .................. 370/338
7,072,339 B2 * 7/2006 Tsuchiya et al. ............ 370/392
2004/0093434 A1 * 5/2004 Hovell et al. ............... 709/249

FOREIGN PATENT DOCUMENTS

| EP | 0 840 482 A1 | 5/1998 |
|---|---|---|
| JP | 11-55319 A | 2/1999 |
| WO | WO 01/22664 A1 | 3/2001 |

OTHER PUBLICATIONS

Afifi H et al: "Methods of Ipv4-Ipv6 transition" Proceedings IEEE International Symposium on Computers and Communications, XX, XX, Jul. 6, 1999, pp. 478-484, XP002159749.

* cited by examiner

Primary Examiner—Kenny Lin
(74) Attorney, Agent, or Firm—Sughrue Mion, Pllc.

(57) ABSTRACT

Disclosed is an apparatus for converting internet protocol addresses, including: an address allocating unit for allocating a first private IP address and a second private IP address of a first IP address format to a first terminal and a second terminal upon an access request of the first terminal; an address generating unit for generating a first public IP address of a second IP address format from a hardware address of the first terminal; an address acquiring unit for acquiring a second public IP address of the second IP address format corresponding to a domain name of the second terminal from a domain name server; a storing unit for storing a mapping table where the first private IP address and the second private IP address correspond respectively to the first public IP address and the second public IP address; and a control unit for providing the first private IP address and the second private IP address to the first terminal.

16 Claims, 5 Drawing Sheets

APPARATUS FOR CONVERTING INTERNET PROTOCAL ADDRESS, AND COMMUNICATION METHOD USING THE SAME

BACKGROUND OF THE INVENTION

The present application is based on Korean Patent Application No. 2002-01016, filed on Jan. 8, 2002, which is incorporated herein by reference.

1. Field of the Invention

The present invention relates to an IPv4-IPv6 converting apparatus for communication between an IPv4 terminal and an IPv6 terminal and a method therefor, and more particularly, to an IPv4-IPv6 converting apparatus for performing communication between an IPv4 terminal using IPv4 as a communication protocol and an IPv6 terminal using IPv6 as a communication protocol, and a method therefor.

2. Description of the Prior Art

The most widely-known protocol of a network layer for the Transmission Control Protocol/Internet Protocol (TCP/IP) communication is an internet protocol (IP). The IP embodies an addressing service for designating a destination for performing communication among a plurality of nodes connecting the network, which is provided by the network layer which is the third layer of an open systems interconnection (OSI) reference model. The generally-used IP format is an IP version 4 (IPv4). The IPv4 has an IP address composed of 32 bits.

Recently, the internet has been widely used with computers in the daily life of users, and thus a number of users using the internet and a number of addresses have been sharply increased. Accordingly, the IPv4 internet addressing system of 32 bits cannot meet the demand of addresses. In order to solve deficiency of the IP addresses, an IP version 6 (IPv6) has been developed as a next generation IP by the Internet Engineering Task Force (IETF).

The IPv6 uses an address system of 128 bits. Here, the IPv6 not only extends the IP addresses but also simplifies a common header format to cut down band width expenses and common header processing expenses. In addition, the IPv6 introduces a flow label concept to efficiently process multimedia data in a real time. Furthermore, the IPv6 provides an enhanced security function through authentication, data entirety, and data secrecy.

According to the development of the IPv6, the internet network includes an IPv4 based internet communication network and an IPv6 based internet communication network. In order to execute communication between an IPv4 network terminal and an IPv6 network terminal, an IPv4-IPv6 converting apparatus for linking the IPv4 based internet communication network and the IPv6 based internet communication network is required.

Figure 1:
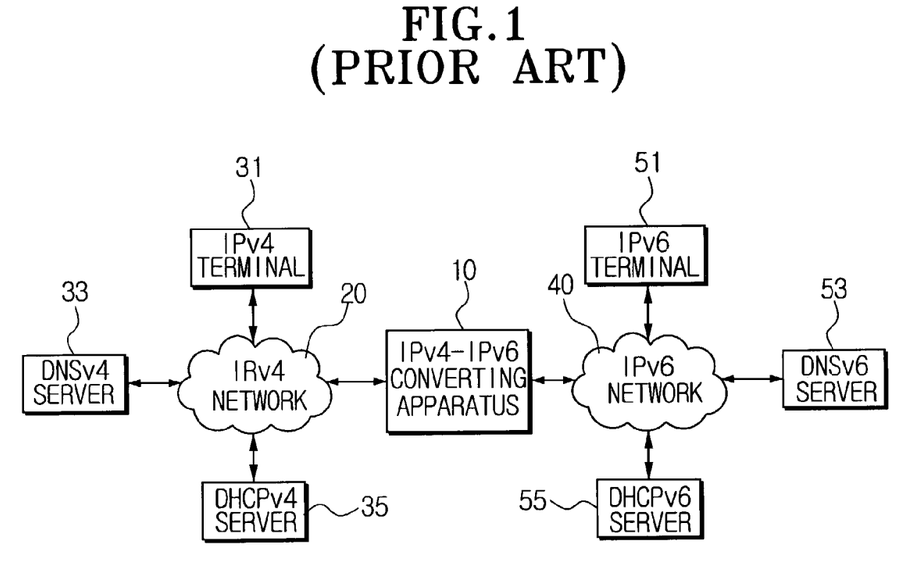
FIG. 1 is a block diagram illustrating a communication network system using a conventional IPv4-IPv6 converting apparatus.

FIG. 1 is a block diagram illustrating a communication network system using a conventional IPv4-IPv6 converting apparatus. In the communication network system of FIG. 1, an IPv4 network 20 and an IPv6 network 40 are connected by the conventional IPv4-IPv6 converting apparatus 10. An IPv4 terminal 31, a domain name service version 4 (DNSv4) server 33 and a dynamic host configuration protocol version 4 (DHCPv4) server 35 are connected to the IPv4 network 20. The DNSv4 server 33 manages domain information of the IPv4 network 20. The DHCPv4 server 35 dynamically allocates an IPv4 address to the IPv4 terminal 31 connected to the IPv4 network 20.

An IPv6 terminal 51, a domain name service version 6 (DNSv6) server 53 and a dynamic host configuration protocol version 6 (DHCPv6) server 55 are connected to the IPv6 network 40. The DNSv6 server 53 manages domain information of the IPv6 network 40. The DHCPv6 server 55 dynamically allocates an IPv6 address to the IPv6 terminal 51 connected to the IPv6 network 40.

The communication between the IPv4 terminal 31 and the IPv6 terminal 51 will now be explained with reference to FIG. 1. The IPv4 terminal 31 queries an IPv4 address corresponding a domain name of the IPv6 terminal 51 to the DNSv4 server 33. The DNSv4 server 33 provides the IPv4 address corresponding to the domain name of the IPv6 terminal 51 demanded by the IPv4 terminal 31 to the conventional IPv4-IPv6 converting apparatus 10. At this time, a source address is the IPv4 address of the DNSv4 server 33, and a destination address is the IPv4 address of the IPv4-IPv6 converting apparatus 10. The conventional IPv4-IPv6 converting apparatus 10 converts the IPv4 address of the DNSv4 server 33 which is the source address into an IPv6 address. Here, the conventional IPv4-IPv6 converting apparatus 10 converts the IPv4 address of the DNSv4 server 33 into the IPv6 address by adding a prefix to the IPv4 address of the DNSv4 server 33. In addition, the conventional IPv4-IPv6 converting apparatus 10 has an IPv6 address of the DNSv6 server 53 for managing domain information of terminals connected to the IPv6 network 40 such as the IPv6 terminal 51. Accordingly, the conventional IPv4-IPv6 converting apparatus 10 accesses the DNSv6 server 53, and queries the IPv6 address corresponding to the domain name of the IPv6 terminal 51. Here, a source address is the IPv6 address of the DNSv4 server 33, and a destination address is the IPv6 address of the DNSv6 server 53.

The DNSv6 server 53 receiving request for the IPv6 address corresponding to the domain name of the IPv6 terminal 51 extracts the IPv6 address corresponding to the domain name of the IPv6 terminal 51 according to a stored table value, and provides it to the IPv4-IPv6 converting apparatus 10. The conventional IPv4-IPv6 converting apparatus 10 converts the IPv6 address of the IPv6 terminal 51 into an IPv4 address, and provides the IPv4 address of the IPv6 terminal 51 to the DNSv4 server 33. The DNSv4 server 33 provides the IPv4 address of the IPv6 terminal 51 to the IPv4 terminal 31. Thus, the IPv4 terminal 31 can be informed of the IPv4 address corresponding to the domain name of the IPv6 terminal 51.

The IPv4 terminal 31 receiving the IPv4 address corresponding to the domain name of the IPv6 terminal 51 transmits a communication request signal to the conventional IPv4-IPv6 converting apparatus 10 for performing the communication with the IPv6 terminal 51. Here, a source address is the IPv4 address of the IPv4 terminal 31, and a destination address is the IPv4 address of the IPv6 terminal 51. The conventional IPv4-IPv6 converting apparatus 10 generates an IPv6 address by adding a prefix to the IPv4 address of the IPv4 terminal 31, and converts the IPv4 address of the IPv6 terminal 51 into the IPv6 address received from the DNSv6 server 53. Therefore, the conventional IPv4-IPv6 converting apparatus 10 transmits an access request signal of the IPv4 terminal 31 to the IPv6 terminal 31 through an address of the IPv6 system for the IPv4 terminal 31 and the IPv6 terminal 51. The IPv4 terminal 31 and the IPv6 terminal 51 execute the mutual communication by using variations of addresses of the conventional IPv4-IPv6 converting apparatus 10.

However, in a communication network system using a conventional IPv4-IPv6 converting apparatus 10, the IPv4 terminal 31 communications with the IPv6 terminal 51 with the unique public IP address. Accordingly, IPv4 terminals which do not have public IP addresses are not able to communicate with IPv6 terminals. Since the IPv4 terminals require the public IP addresses to communicate with the IPv6 terminals, deficiency of the IPv4 addresses gets serious.

In the communication network system using the conventional IPv4-IPv6 converting apparatus 10, the DNSv4 server 33 for requiring the IP address corresponding to the domain name of the IPv6 terminal 51 to the DNSv6 server 53 is required so that the IPv4 terminal 31 can be provided with the IP address corresponding to the domain name of the IPv6 terminal 51. As a result, expenses for building the communication network system using the conventional IPv4-IPv6 converting apparatus 10 are considerably increased.

SUMMARY OF THE INVENTION

Accordingly, it is a primary object of the present invention to provide an IPv4-IPv6 address converting apparatus which can overcome deficiency of public IP addresses generated because IPv4 terminals use the public IP addresses.

Another object of the present invention is to provide an IPv4-IPv6 address converting apparatus which can remarkably cut down expenses of a communication network system in forming a DNSv4 server for requiring an IP address corresponding to a domain name of an IPv6 terminal to a DNSv6 server.

In order to achieve the above-described objects of the present invention, there is provided an apparatus for converting IP addresses for mutual communication between a first terminal and a second terminal which have different IP address formats, including: an address allocating unit for allocating a first private IP address and a second private IP address of a first IP address format to the first terminal and the second terminal upon an access request of the first terminal; an address generating unit for generating a first public IP address of a second IP address format from a hardware address of the first terminal; an address acquiring unit for acquiring a second public IP address of the second IP address format corresponding to a domain name of the second terminal from a domain name server; a storing unit for storing a mapping table where the first private IP address and the second private IP address correspond respectively to the first public IP address and the second public IP address; and a control unit for providing the first private IP address and the second private IP address to the first terminal. Preferably, the control unit demands registration of the first public IP address to the control unit.

In one preferred aspect of the invention, the apparatus for converting the IP addresses further includes an address converting unit for respectively converting the first private IP address and the second private IP address into the first public IP address and the second public IP address on the basis of the mapping table. Accordingly, the control unit controls the address converting unit to respectively convert a source address and a destination address of an IP packet transmitted from the first terminal to the second terminal into the first public IP address and the second public IP address according to the mapping table. Moreover, the control unit controls the address converting unit to respectively convert a source address and a destination address of an IP packet transmitted from the second terminal to the first terminal into the second public IP address and the first public IP address according to, the mapping table.

Preferably, the first IP address format is an IPv4 and the second IP address format is an IPv6. In addition, the hardware address of the first terminal is a media access control address which is an interface identification (ID) for distinguishing interfaces connected to the network. Here, the media access control address is composed of 48 bits. Therefore, the address generating unit adds 16 bits to the interface ID of 48 bits to compose 64 bits, and generates the first public IP address by adding a prefix to discriminate a kind and sub-net of the address of the first terminal. Here, the prefix is composed of 64 bits.

On the other hand, a communication network system includes: an IPv4 terminal having a hardware address and a domain name corresponding to the hardware address, and executing mutual communication with a device connected to an IPv4 network; an IPv6 terminal having a first IPv6 address of an IPv6 system and a domain name corresponding to the first IPv6 address, and executing mutual communication with a device connected to an IPv6 network; a domain name server for storing a table where the domain name of the IPv6 terminal and the first IPv6 address corresponding to the domain name are matched and recorded; and an address converting apparatus for allocating a first private IPv4 address of an IPv4 system to the IPv4 terminal, generating the first IPv6 address of the IPv6 system in the IPv4 terminal, connecting to the domain name server, acquiring a second IPv6 address corresponding to the domain name of the IPv6 terminal, and converting the second IPv6 address into a second private IPv4 address of the IPv4 system.

Preferably, the hardware address of the IPv4 terminal is a media access control address which is an interface ID for distinguishing interfaces connected to the network. Here, the media access control address is composed of 48 bits. Therefore, the address converting apparatus adds 16 bits to the interface ID of 48 bits to compose 64 bits, and generates the first IPv6 address of the IPv6 system in the IPv4 terminal by adding a prefix to discriminate a kind and sub-net of the address of the IPv4 terminal. Here, the prefix is composed of 64 bits.

In addition, a communication method using an apparatus for converting IP addresses for mutual communication between a first terminal and a second terminal which have different IP address formats, includes the steps of: allocating a first private IP address of a first IP address format to the first terminal requesting access; generating a first public UP address of a second IP address format from a hardware address of the first terminal; acquiring a second public IP address of the second IP address format of the second terminal from a domain name server for managing a domain name of the second terminal and an IP address corresponding to the domain name; allocating a second private IP address of the first IP address format to the second terminal; and providing the first private UP address and the second private IP address to the first terminal.

Preferably, the communication method using the apparatus for converting the IP addresses further includes a table generation step for generating a mapping table for respectively matching the first private IP address and the second private IP address to the first public IP address and the second public IP address, before providing the first private IP address and the second private IP address to the first terminal. In addition, the communication method using the apparatus for converting the UP addresses further includes the steps of: converting a source address and a destination address of an IP packet transmitted from the first terminal to the second terminal into the first public IP address and the second public IP address according to the mapping table; and converting a source address and a destination address of an IP packet transmitted from the second terminal to the first terminal into the second public IP address and the first public IP address according to the mapping table.

Moreover, the communication method using the apparatus for converting the IP addresses further includes a step for demanding registration of the first public IP address to the domain name server after generating the first public IP address.

Preferably, the first IP address format is an IPv4 and the second IP address format is an IPv6. In addition, the hardware address of the first terminal is a media access control address which is an interface ID for distinguishing interfaces connected to the network. Here, the media access control address is composed of 48 bits. Therefore, the step for generating the first public IP address in the first terminal adds 16 bits to the interface ID of 48 bits to compose 64 bits, and generates the first public IP address by adding a prefix to discriminate a kind and sub-net of the address of the first terminal. Here, the prefix is composed of 64 bits.

In accordance with the present invention, when the IPv4 terminal communicates with the IPv6 terminal, the IPv4 terminal uses the first private IPv4 address and the second private IPv4 address allocated by the IPv4-IPv6 address converting apparatus, instead of using the public IPv4 address of the IPv4 system. Accordingly, the mutual communication can be performed between the IPv4 terminal and the IPv6 terminal through the private IPv4 address. In addition, the IPv4 terminal which does not have the public IP address is provided with the IP address of the IPv4 system, and the IPv6 terminal is provided with the IP address of the IPv4 system, to overcome deficiency of the public IP addresses of the IPv4 system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

An apparatus for converting internet protocol addresses and a communication method using the same in accordance with preferred embodiments of the present invention will now be described in detail with reference to the accompanying drawings.

Figure 2:
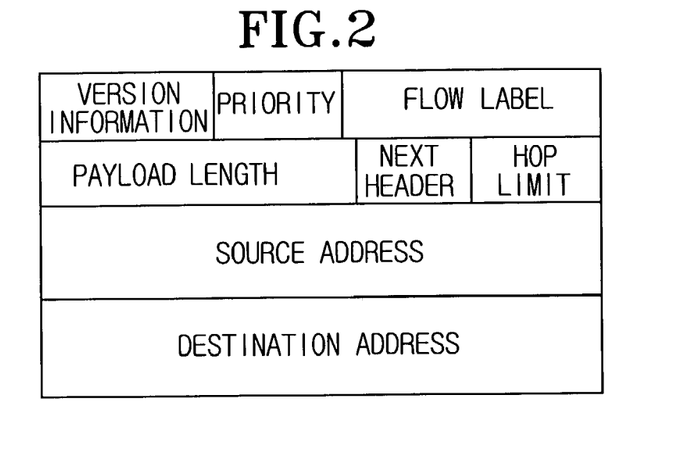
FIG. 2 is a block diagram illustrating a header format of IPv6.

Firstly, a header format of an IPv6 and a format of an IPv6 address will now be explained. FIG. 2 is a block diagram illustrating the header format of the IPv6. The header format of the IPv6 includes eight regions. A version information region contains version information of the IP. Here, the version information of the IPv6 has a value of '6'. A priority region includes priority of the IP, namely a traffic level for performing the communication. A flow label region contains properties of a flow to which an IPv6 packet belongs. A payload length region has information on a length of data following an IPv6 header. A next header region includes information on a kind of a header following the IPv6 header. A hop limit region contains information on a maximum number of routers which the IPv6 packet passes through. A source address region and a destination address region respectively include an address of a source terminal transmitting the IPv6 packet and an address of a destination terminal receiving the IPv6 packet from the terminal having the source address. Here, the source address and the destination address are respectively composed of 128 bits.

Figure 3:
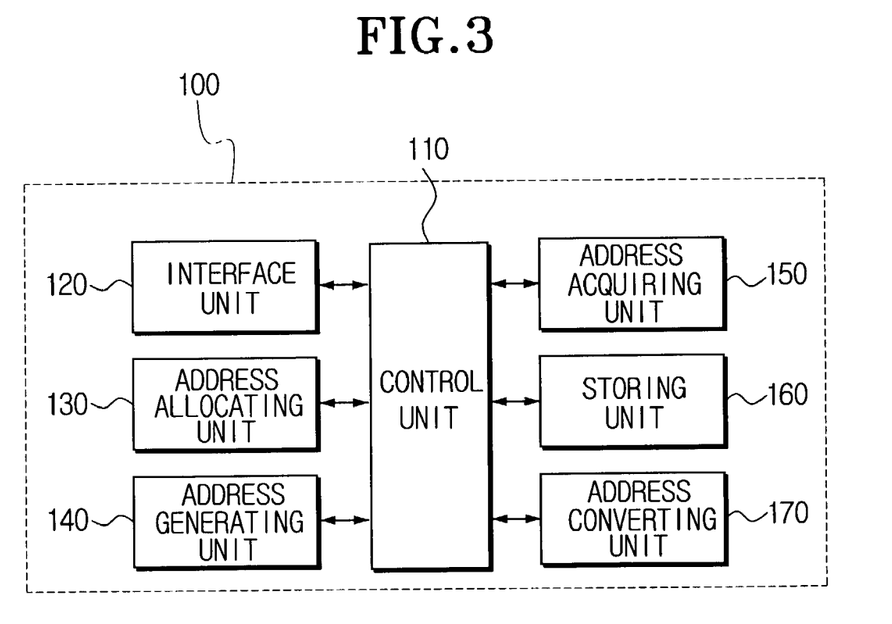
FIG. 3 is a block diagram illustrating an IPv4-IPv6 address converting apparatus in accordance with a preferred embodiment of the present invention.

FIG. 3 is a block diagram illustrating an IPv4-IPv6 address converting apparatus 100 in accordance with a preferred embodiment of the present invention, including: an interface unit 120; an address allocating unit 130; an address generating unit 140; an address acquiring unit 150; and a control unit 110.

The interface unit 120 receives a signal from an IPv4 terminal (not shown) using an IPv4 and an IPv6 terminal (not shown) using an IPv6, and transmits the signal to a terminal corresponding to a destination address of the signal according to a control signal. The address allocating unit 130 allocates a first private IPv4 address of an IPv4 system to the IPv4 terminal according to a connection request signal of the IPv4 terminal to the IPv6 terminal received through the interface unit 120.

Figure 4:
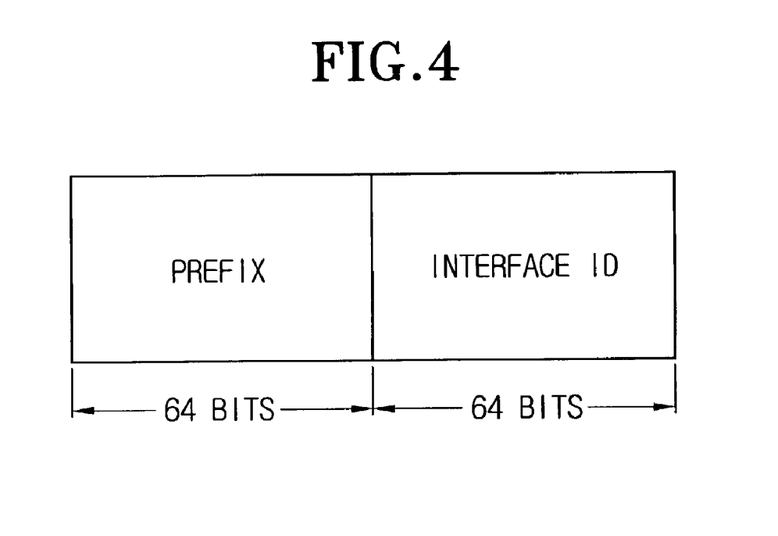
FIG. 4 shows an example of an IPv6 address of an IPv6 system generated by adding a prefix to an interface ID of an IPv4 terminal.

The address generating unit 140 generates a first public IPv6 address of an IPv6 system in the IPv4 terminal from a hardware address of the IPv4 terminal received when the IPv4 terminal demands the communication with the IPv6 terminal. Here, the hardware address of the IPv4 terminal is a media access control address which is an interface ID for distinguishing interfaces connected to the network. Generally, the media access control address is composed of 48 bits. The address generating unit 140 adds 16 bits to the media access control address of 48 bits to compose a 64 bits interface ID. As shown in FIG. 4, the address generating unit 140 preferably generates the first public IPv6 address by adding a prefix for discriminating a kind and sub-net of the address of the IPv4 terminal to the 64 bit interface ID of the IPv4 terminal. Here, the prefix is composed of 64 bits.

The address acquiring unit 150 connects to a domain name server version 6 (DNSv6) server (not shown) for storing a domain name of the IPv6 terminal and a public IPv6 address corresponding to the domain name in form of a table, and acquires a second public IPv6 address of the IPv6 system corresponding to the domain name of the IPv6 terminal. The control unit 110 controls transmission/reception of the signal through the interface unit 120, and also controls the address allocating unit 130 to allocate the private IPv4 address of the IPv4 system to the IPv4 terminal requiring the IP address. In addition, the control unit 110 controls the address generating unit 140 to generate the public IPv6 address of the IPv6 system for the IPv4 terminal, and also controls the address acquiring unit 150 to acquire the public IPv6 address of the IPv6 system for the IPv6 terminal.

Accordingly, when receiving the connection request signal from the IPv4 terminal allocated to the first private IPv4 address through the interface unit 120 for communication with the IPv6 terminal allocated to a second private IPv4 address, the control unit 110 transmits the connection request signal to the IPv6 terminal through the interface unit 120 by using the first public IPv6 address and the second public IPv6 address corresponding to the first private IPv4 address and the second private IPv4 address.

Preferably, the IPv4-IPv6 address converting apparatus 100 further includes a storing unit 160 and an address converting unit 170. Here, the storing unit 160 stores a mapping table recording the first private IPv4 address and the first public IPv6 address of the IPv4 terminal and the first private IPv4 address and the second public IPv6 address of the IPv6 terminal according to a control signal from the control unit 110. At this time, the control unit 110 can store the hardware address of the IPv4 terminal in the storing unit 160. The address converting unit 170 converts the first private IPv4 address and the second private IPv4 address into the first public IPv6 address and the second public IPv6 address on the basis of the mapping table of the storing unit 160. On the other hand, when receiving the connection request signal from the IPv4 terminal receiving the first private IPv4 address and the second private IPv4 address through the interface unit 120 for communication with the IPv6 terminal, the control unit 110 extracts the mapping table from the storing unit 160, and provides the mapping table to the address converting unit 170 to convert the first private IPv4 address and the second private IPv4 address into the first public IPv6 address and the second public IPv6 address. In addition, the control unit 110 can demand registration of the first public IPv6 address to the DNSv6 server.

Accordingly, when the IPv4 terminal intends to communicate with the IPv6 terminal, the IPv4 terminal does not use the public IPv4 address of the IPv4 system, but uses the first private IPv4 address and the second private IPv4 address which are allocated by the IPv4-IPv6 address converting apparatus. As a result, the IPv4 terminal can communicate with the IPv6 terminal through the private IPv4 address, not the public IPv4 address.

Figure 5:
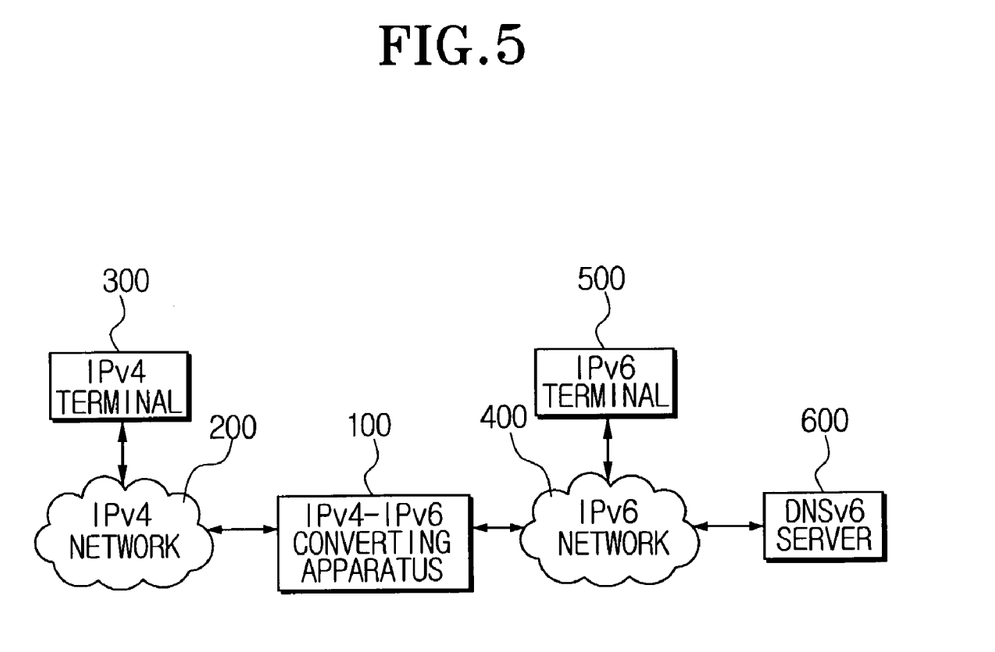
FIG. 5 is a block diagram illustrating a communication network system using the IPv4-IPv6 address converting apparatus of FIG. 3.

FIG. 5 is a block diagram illustrating a communication network system using the IPv4-IPv6 address converting apparatus of FIG. 3. In the communication network system of FIG. 5, an IPv4 network 200 and an IPv6 network 400 are connected by the IPv4-IPv6 address converting apparatus 100. An IPv4 terminal 300 is connected to the IPv4 network 200, and an IPv6 terminal 500 and a DNSv6 server 600 are connected to the IPv6 network 400.

The IPv4 terminal 300 queries an IP address to the IPv4-IPv6 address converting apparatus 100 in order to communicate with the IPv6 terminal 500. The IPv4-IPv6 address converting apparatus 100 allocates a first private IPv4 address to the IPv4 terminal 300, and generates a first public IPv6 address of the IPv6 system in the IPv4 terminal 300. Here, the IPv4-IPv6 address converting apparatus 100 stores a hardware address from the IPv4 terminal 300, the first private IPv4 address allocated to the IPv4 terminal 300, and the first public IPv6 address of the IPv4 terminal. Thus, the IPv4 terminal 300 queries an IP address corresponding to a domain name of the IPv6 terminal 500 to the IPv4-IPv6 address converting apparatus 100 by using the first private IPv4 address allocated by the IPv4-IPv6 address converting apparatus 100. Here, the IPv4-IPv6 address converting apparatus 100 connects to the DNSv6 server 600 and queries the IP address corresponding to the IPv6 terminal 500. The DNSv6 server 600 extracts a second public IPv6 address of the IPv6 system corresponding to the domain name of the IPv6 terminal 500 through the stored table, and provides it to the IPv4-IPv6 address converting apparatus 100. The IPv4-IPv6 address converting apparatus 100 converts the second public IPv6 address into a second private IP address of the IPv4 system, and provides it to the IPv4 terminal 300.

Accordingly, the IPv4 terminal 300 uses the first private IP address as a source address and the second private IP address as a destination address, and transmits a communication request signal to the IPv4-IPv6 address converting apparatus 100 so as to communicate with the IPv6 terminal 500. Here, the IPv4-IPv6 address converting apparatus 100 converts the first private IP address and the second private IP address into the first public IPv6 address and the second public IPv6 address, and transmits the communication request signal to the IPv6 terminal 500.

As a result, the communication network system using the IPv4-IPv6 address converting apparatus 100 allocates the private IPv4 address of the IPv4 system to the IPv4 terminal 300, instead of the public IPv4 address of the IPv4 system, thereby overcoming deficiency of the public IPv4 addresses of the IPv4 system.

Figure 6:
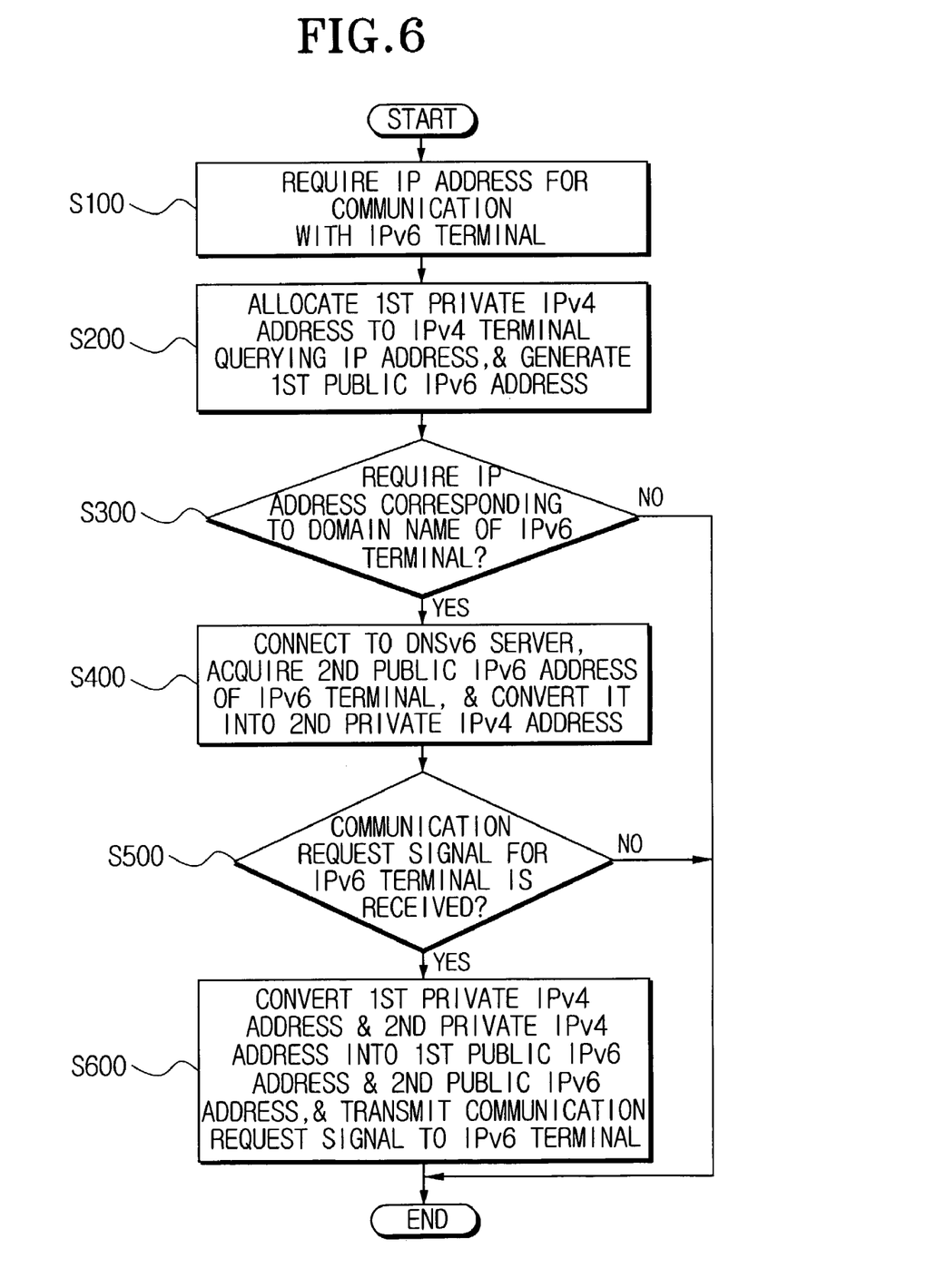
FIG. 6 is a flowchart showing sequential steps of a communication method between an IPv4 terminal and an IPv6 terminal using an IPv4-IPv6 address converting apparatus in accordance with a preferred embodiment of the present invention.

FIG. 6 is a flowchart showing sequential steps of a communication method between the IPv4 terminal 300 and the IPv6 terminal 500 using the IPv4-IPv6 address converting apparatus 100 in accordance with a preferred embodiment of the present invention. Firstly, the IPv4 terminal 300 queries an IP address to the IPv4-IPv6 address converting apparatus 100 to communicate with the IPv6 terminal 500 (S100). Here, the address of the IPv4 terminal 300 is the hardware address of 48 bits which is the media access control address. The IPv4-IPv6 address converting apparatus 100 allocates a first private IPv4 address of the IPv4 system to the IPv4 terminal 300 requiring the IP address, and generates a first public IPv6 address of the IPv6 system in the IPv4 terminal 300 (S200).

The IPv4-IPv6 address converting apparatus 100 confirms whether a signal for requiring the IP address corresponding to a domain name of the IPv6 terminal 500 is received from the IPv4 terminal 300 (S300). When the signal for requiring the IP address corresponding to the domain name of the IPv6 terminal 500 is received, the IPv4-IPv6 address converting apparatus 100 connects to the DNSv6 server 600, and acquires a second public IPv6 address of the IPv6 system corresponding to the domain name of the IPv6 terminal 500 (S400). In addition, the IPv4-IPv6 address converting apparatus 100 converts the second public IPv6 address into a second private IPv4 address of the IPv4 system.

The IPv4-IPv6 address converting apparatus 100 judges whether a communication request signal is received from the IPv4 terminal 300 having the first private IPv4 address to communicate with the IPv6 terminal 500 having the second private IPv4 address (S500). When the communication request signal is received from the IPv4 terminal 300 through the first private IPv4 address to communicate with the IPv6 terminal 500 having the second private IPv4 address, the IPv4-IPv6 address converting apparatus 100 converts the first private IPv4 address and the second private IPv4 address into the first public IPv6 address and the second public IPv6 address of the IPv6 system (S600). In addition, the IPv4-IPv6 address converting apparatus 100 transmits a connection request signal of the IPv4 terminal 300 to the IPv6 terminal 500 by using the first public IPv6 address and the second public IPv6 address.

Figure 7:
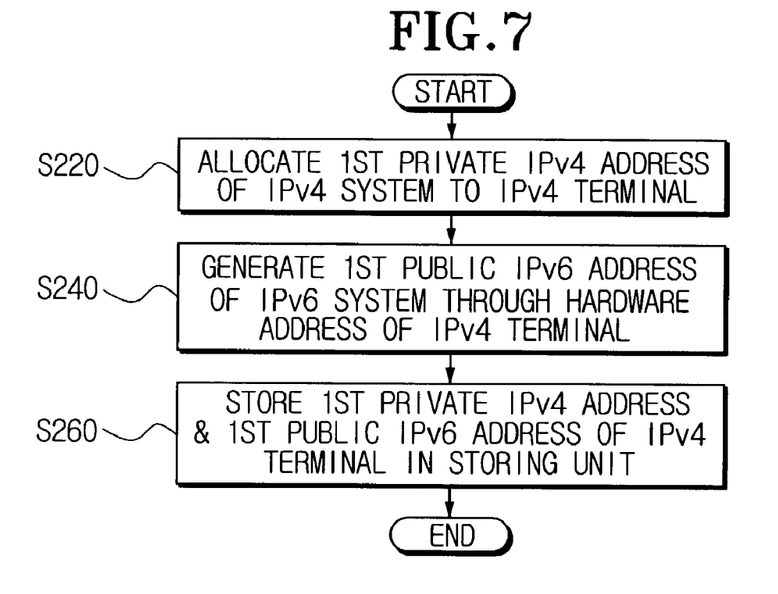
FIG. 7 is a flowchart showing a detailed process of S200 of FIG. 6.

FIG. 7 is a flowchart showing a detailed process of S200 of FIG. 6. The address allocating unit 130 allocates the first private IPv4 address of the IPv4 system to the IPv4 terminal 300 requiring the IP address through the hardware address of the media access control address (S220). Preferably, the address allocating unit 130 allocates the private IP addresses through a stored table to allocate the private IP addresses to the terminals executing the communication on the IPv4 network 200, such as the IPv4 terminal 300. On the other hand, the address generating unit 140 generates the first public IPv6 address of the IPv6 system by adding a prefix to 64 bits obtained by adding 16 bits to a 48 bit hardware address of the IPv4 terminal 300 requiring the WP address (S240). The control unit 110 stores the first private IPv4 address and the first public IPv6 address allocated and generated by the address allocating unit 130 and the address generating unit 140 in the storing unit 160 in form of a mapping table (S260).

Accordingly, when receiving the connection request signal from the IPv4 terminal 300 through the first private IPv4 address for access to the IPv6 terminal 500 having the second private IPv4 address, the control unit 110 extracts the mapping table from the storing unit 160, and provides it to the address converting unit 170. Therefore, the address converting unit 170 converts the first private IPv4 address of the IPv4 terminal 300 into the first public IPv6 address on the basis of the mapping table.

Figure 8:
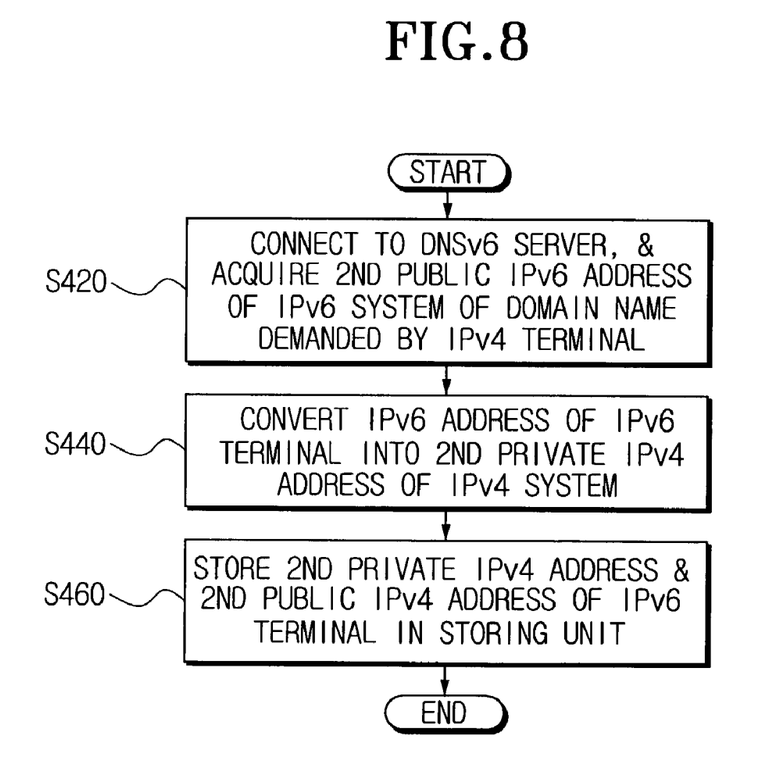
FIG. 8 is a flowchart showing a detailed process of S400 of FIG. 6.

FIG. 8 is a flowchart showing a detailed process of S400 of FIG. 6. The address acquiring unit 150 connects to the DNSv6 server 600 of the IPv6 system by using the first private IPv6 address of the IPv4 terminal 300, and queries the IP address corresponding to the domain name of the IPv6 terminal 500 (S420). Here, the DNSv6 server 600 extracts the IPv6 address of the IPv6 system corresponding to the domain name of the IPv6 terminal 500 from the stored table, and provides it to the address acquiring unit 150. On the other hand, the address allocating unit 130 converts the IPv6 address of the IPv6 system of the IPv6 terminal 500 acquired by the address acquiring unit 150 into the second private IPv4 address of the IPv4 system (S440). Accordingly, the control unit 110 stores the IPv6 address of the IPv6 system and the second private IPv4 address of the IPv4 system which are acquired and allocated by the address acquiring unit 150 and the address allocating unit 130 in the storing unit 160 (S460).

Therefore, the private IP of the IPv4 system is allocated to the IPv4 terminal 300 and the IPv6 terminal 500, instead of the public IP, thereby overcoming deficiency of the IP addresses of the IPv4 system.

In accordance with the present invention, when an IPv4 terminal intends to communicate with an IPv6 terminal, the IPv4 terminal does not use a public IPv4 address of the IPv4 system, but uses a first private IPv4 address and a second private IPv4 address which are allocated by the IPv4-IPv6 address converting apparatus. As a result, the IPv4 terminal can communicate with the IPv6 terminal through the private IPv4 address, not the public IPv4 address.

Moreover, the IP address of the IPv4 system is allocated to the IPv4 terminal which does not have the public IP address, and also allocated to the IPv6 terminal, thereby overcoming deficiency of the public IP addresses of the IPv4 system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for converting an Internet Protocol (IP) address format for mutual communication between a first terminal and a second terminal which have different IP address formats, the apparatus comprising:
    an address allocating unit for allocating a first private IP address and a second private IP address of a first IP address format to the first terminal and the second terminal upon an access request of the first terminal;
    an address generating unit for generating a first public IP address of a second IP address format from a hardware address of the first terminal;
    an address acquiring unit for acquiring a second public IP address of the second IP address format corresponding to a domain name of the second terminal from a domain name server; and
    a control unit for providing the first private IP address and the second private IP address to the first terminal; and
    a storing unit for storing a mapping table where the first private IP address and the second private IP address correspond respectively to the first public IP address and the second public IP address.

2. The apparatus according to claim 1, wherein the control unit requests registration of the first public IP address to the domain name server.

3. The apparatus according to claim 2, further comprising an address converting unit for converting the first private IP address and the second private IP address into the first public IP address and the second public IP address, respectively, on the basis of the mapping table, wherein the control unit controls the address converting unit to convert a source address and a destination address of a first IP packet transmitted from the first terminal to the second terminal into the first public IP address and the second public IP address, respectively, according to the mapping table.

4. The apparatus according to claim 3, wherein the control unit controls the address converting unit to convert a source address and a destination address of a second IP packet transmitted from the second terminal to the first terminal into the second public IP address and the first public IP address, respectively, according to the mapping table.

5. The apparatus according to claim 1, wherein the first IP address format is an Internet Protocol version 4 and the second IP address format is an Internet Protocol version 6.

6. The apparatus according to claim 5, wherein the hardware address of the first terminal is a media access control address which is an interface identification for distinguishing interfaces connected to the network.

7. A communication network system, comprising:
    an Internet Protocol version 4 (IPv4) terminal having a hardware address and a domain name corresponding to the hardware address, the IPv4 terminal configured to execute mutual communication with a device connected to an IPv4network;
    an Internet Protocol version 6 (IPv6) terminal having a first IPv6address of an IPv6system and a domain name corresponding to the first IPv6 address, the IPv6 terminal configured to execute mutual communication with a device connected to an IPv6 network;

a domain name server for storing a table where the domain name of the IPv6 terminal and the first IPv6 address corresponding to the domain name are matched and recorded; and an address converting apparatus for allocating a first private IPv4 address of an IPv4 system to the IPv4 terminal, generating the first IPv6 address of the IPv6 system in the IPv4 terminal from the hardware address of the IPv4 terminal, connecting to the domain name server, acquiring a second IPv6 address corresponding to the domain name of the IPv6 terminal, and converting the second IPv6 address into a second private IPv4 address of the IPv4 system.

8. The system according to claim 7, wherein the hardware address of the IPv4 terminal comprises a media access control address which is an interface identification for distinguishing interfaces connected to the network.

9. The system according to claim 8, wherein the address converting apparatus generates the IPv6 address of the IPv6 system in the IPv4 terminal by adding a prefix to discriminate a kind and sub-net of the address of the IPv4 terminal to the interface identification.

10. A communication method using an apparatus for converting an Internet Protocol address format for mutual communication between a first terminal and a second terminal which have different Internet Protocol (IP) address formats, comprising the steps of:

allocating a first private IP address of a first IP address format to the first terminal requesting access;

generating a first public IP address of a second IP address format from a hardware address of the first terminal;

acquiring a second public IP address of the second IP address format of the second terminal from a domain name server for managing a domain name of the second terminal and an IP address corresponding to the domain name;

allocating a second private IP address of the first IP address format to the second terminal;

providing the first private IP address and the second private IP address to the first terminal, wherein the method further comprises generating a mapping table for matching the first private IP address and the second private IP address to the first public IP address and the second public IP address, respectively, before providing the first private IP address and the second private IP address to the first terminal.

11. The method according to claim 10, further comprising a step for converting a source address and a destination address of an IP packet transmitted from the first terminal to the second terminal into the first public IP address and the second public IP address, respectively, according to the mapping table.

12. The method according to claim 11, further comprising a step for converting a source address and a destination address of an IP packet transmitted from the second terminal to the first terminal into the second public IP address and the first public IP address, respectively, according to the mapping table.

13. The method according to claim 12, further comprising a step for demanding registration of the first public IP address to the domain name server after generating the first public IP address.

14. The method according to claim 13, wherein the first IP address format is an Internet Protocol version 4 and the second IP address format is an Internet Protocol version 6.

15. The method according to claim 14, wherein the hardware address of the first terminal comprises a media access control address which is an interface identification for distinguishing interfaces connected to the network.

16. The method according to claim 15, wherein the step for generating the first public IP address in the first terminal includes generating the first public IP address by adding a prefix to discriminate a kind and sub-net of the address of the first terminal to the interface identification.

* * * * *